United States Patent [19]

Kain

[11] Patent Number: 4,621,728
[45] Date of Patent: Nov. 11, 1986

[54] SUSPENSION IDLER METHOD AND APPARATUS

[76] Inventor: Arthur F. Kain, 1726 Virginia Ct., Lakeland, Fla. 33803

[21] Appl. No.: 341,488

[22] Filed: Jan. 21, 1982

Related U.S. Application Data

[63] Continuation-in-part of Ser. No. 283,726, Jul. 15, 1981, Pat. No. 4,354,656, which is a continuation of Ser. No. 174,750, Aug. 4, 1980, Pat. No. 4,301,109.

[51] Int. Cl.⁴ .............................................. B65G 39/10
[52] U.S. Cl. .................................... 198/827; 198/843
[58] Field of Search ................ 198/824, 825, 827, 843

[56] References Cited

U.S. PATENT DOCUMENTS

| | | | |
|---|---|---|---|
| 2,837,202 | 6/1958 | Baechli | 198/824 |
| 3,068,995 | 12/1962 | Poundstone | 198/824 |
| 3,310,160 | 3/1967 | Reilly | 198/827 |
| 3,700,092 | 10/1972 | Stark et al. | 198/824 |
| 3,795,306 | 3/1974 | Motoume | 198/827 |
| 4,011,938 | 3/1977 | Kain | 198/824 |

FOREIGN PATENT DOCUMENTS 540416  10/1941  United Kingdom ................ 198/843

Primary Examiner—Joseph E. Valenza
Assistant Examiner—Jonathan D. Holmes
Attorney, Agent, or Firm—William M. Hobby, III

[57] ABSTRACT

A Conveyor suspension idler mold apparatus for molding a one-piece, elongated, flexible, polymer idler is disclosed along with a method of molding the conveyor idler and the conveyor idler apparatus. A vertical mold has specially shaped cavities for molding the idler without entrapping air, along with shaft positioning and support brackets at each end of the mold for molding a metal shaft into each end of the polymer idler. The shafts positioning and supporting brackets utilize the groove for the bearing retaining ring for locking each shaft into precise position.

7 Claims, 13 Drawing Figures

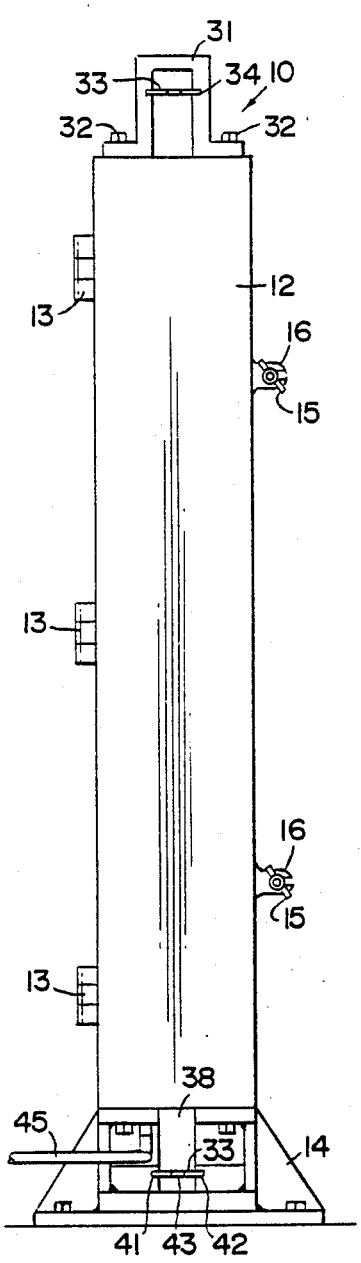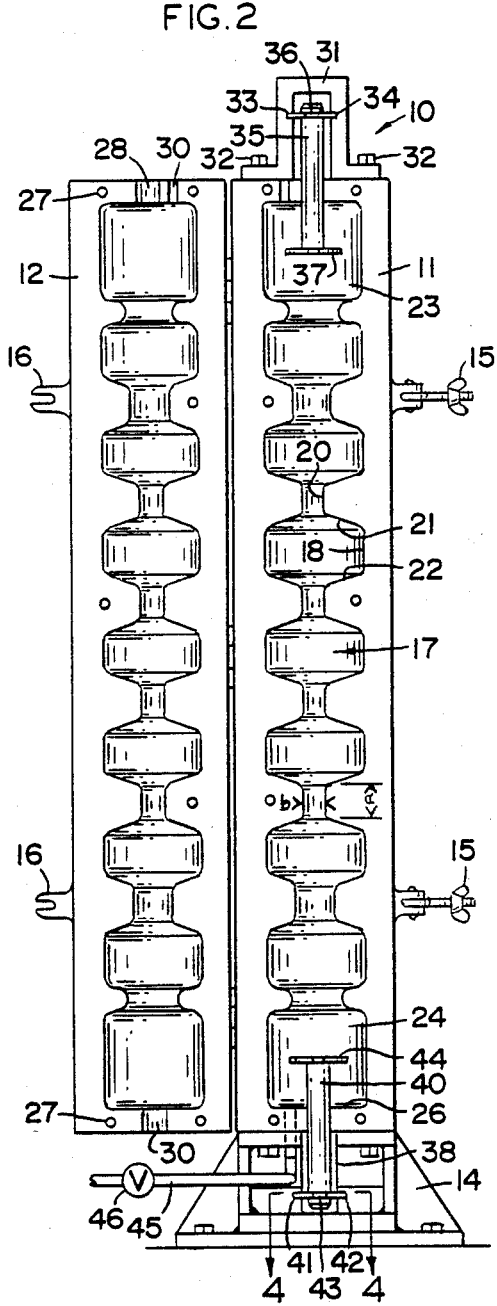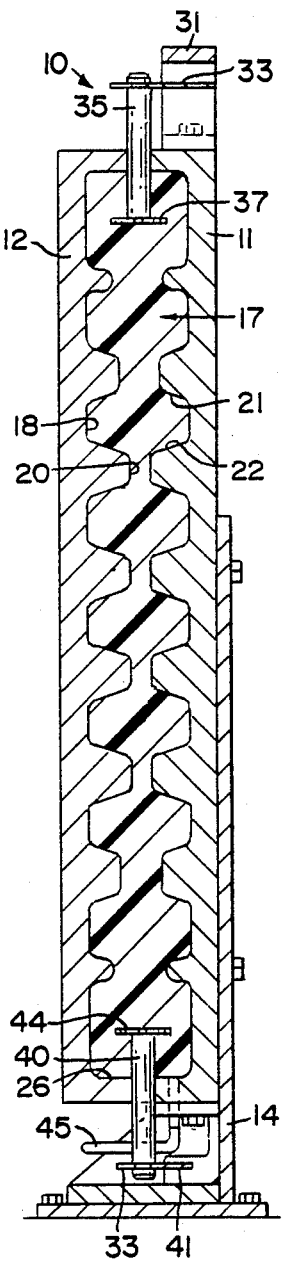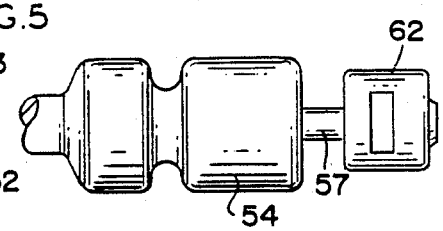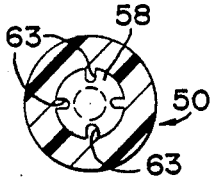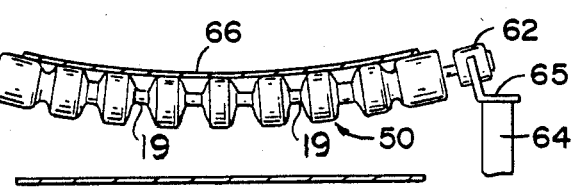

SUSPENSION IDLER METHOD AND APPARATUS

This application is a continuation-in-part of Ser. No. 283,726, filed July 15, 1981, now U.S. Pat. No. 4,354,656, which is a continuation of Ser. No. 174,750, filed Aug. 4, 1980, now U.S. Pat. No. 4,301,109.

BACKGROUND OF THE INVENTION

The present invention relates to conveyor idlers and especially to an apparatus for molding an elongated, flexible, solid polymer idler having metal shafts formed in each end, along with the process for molding the idler and the idler apparatus molded by the process.

In the past, it has been common to provide troughing idlers for conveyor belts and these include flexible troughing idlers of the suspension type. Flexible idlers of the suspension type have achieved commercial success as substitutes for previous conventional types of troughing idler having rigid rollers mounted on fixed axes in certain demanding applications. One such flexible troughing idler of the suspension type includes that illustrated in U.S. Pat. No. 3,876,890 to which provides for an idler structure molded on a wire cable to the ends of which are short shafts swaged to the cable in which the wire cable is held to each end by two terminal bearings and in which the molded rollers are molded from neoprene or the like. Variations of the type of material to be conveyed frequently calls for various trough depths and curvatures. In installations using previous conventional composite troughing idlers formed of individual rotatable rollers, adjustment of the outer ends of the outer rolls was seldom provided for and any desired degree of troughing was determined by the angularity of the axis of the concentrator roller. Since the rollers have rigid inflexible axes, adjustment of the ends to vary troughing curvatures is a necessity on a radius determined by the roller length. With the advent of the flexible, suspension type troughing idlers, adjustment of the suspension point became more feasible. In my prior U.S. Pat. No. 3,033,352 for a Conveyor Idler Mounting Means and Support, I provided an adjustable support for the outer extremities of idler support rollers for conveyor belts of a flexible suspension type troughing idlers which provided for a lateral adjustment to be affected as an incident to the vertical adjustment. These prior art flexible troughing idlers and mounts have worked satisfactorily for many years, but the rise in the cost of raw materials has substantially increased the price of the terminal bearings and thereby substantially increased the cost of suspension troughing idlers and their supporting systems. It is accordingly one advantage of the present invention to provide a molded conveyor idler which is easily formed of polymer materials for providing the necessary strength to support conveyor belts for long periods without failure at less costs.

In my prior U.S. Pat. No. 4,011,938 for a Suspension Idler, I provide for a conveyor idler and idler terminal bearing which has a one-piece, molded, elongated, flexible, polymer idler having a plurality of rollers formed thereon. Each end of the idler has an enlarged portion which is engaged by terminal supports surrounding the enlarged portion to rotatably hold the idler in its mount. The terminal supports are made entirely of polymer materials, but may have a steel pin mounted thereto for mounting to the conveyor idler mount. The present invention is an improvement over this prior U.S. Patent and provides a terminal connection of increased strength in a polymer idler, without using a cable, or a chain, or the like, molded therein. Through a process that assures the exact same length of each idler and avoids alignment problems and entrapped air during molding in a process for making a conveyor idler.

Other typical, flexible idler rollers having a cable or chain center can be seen in U.S. Pat. No. 3,182,788 to Donadio, et al., and in U.S. Pat. No. 3,182,787 to Lorenz, and other patents of interest may be seen in the U.S. and foreign patents cited as references in my prior U.S. Letters Pat. No. 4,011,938. Molding of prior art suspension idlers is accomplished in a horizontal mold and requires tension on the cable in an attempt to achieve concentricity of the cable and molded idler. However, exact concentricity is not obtained and the idlers have small variations in length. For example, in the case of a suspension idler used in conjunction with a 30 inch conveyor belt, lateral movement of one support bearing ⅛ inch would effect a change in belt line height by ⅜ inch. Further, if this dimension were raised, it would result in overloading of that particular belt support and conversely, if it were lowered, it would result in poor contact and failure due to vibrations. It is accordingly an aim of the present invention to provide an elongated, flexible, suspension idler made of solid polymer material, such as a high density polyurethane having end shaft members molded thereinto and a molding apparatus and molding process that avoid the prior problems experienced in molding and using solid polymer suspension idlers.

SUMMARY OF THE INVENTION

A vertical mold apparatus for making a suspension idler has a base to support the mold and a vertical mold having a pair of hinged mold portions having a mold cavity formed therein. Upper and lower shaft positioning and support brackets are attached to one mold portion for supporting a shaft having an anchor thereon protruding into said mold cavity during the molding operation, whereby the shaft becomes a portion of each molded suspension idler. The mold cavity has a plurality of connecting shaft cavity portions with the roller cavity portions having an angled surface from the perimeter thereof to the shaft cavity portions to prevent entrapment of air in the vertical molding operation. The upper and lower shaft positioning supports the shaft portion in the groove for the bearing retainer rings. The vertical mold has an overflow opening to release air as liquid polymer is fed from the bottom of the vertical cavity and to indicate when the mold cavity is filled.

Also, a transparent tube allows visual observation of the shrinkage of the polymer to assure that the cavity is sufficiently filled. A method of making a suspension idler from a molded polymer is also provided in which the vertical mold is made, the shafts are attached to the shaft positioning and support means in the bearing retainer ring groove and the shafts each having an anchor on one end protruding into the mold cavity. The mold cavity is filled from the bottom of the vertically extending mold with a liquid polymer and the polymer cured. The idler is then removed from the molded suspension idler having the shafts protruding from each end.

The suspension idler has an elongated, flexible, solid, molded polymer idler member having a plurality of intermediate rollers formed thereon connected by spaced flexible shaft portions. The idler member has end rollers on each end having a shaft molded therein with each shaft having an anchor portion molded onto the end roller and a protruding portion having a bearing retainer ring groove. The solid, molded polymer idler has intermittent rollers being shaped with an angled side surface between the roller perimeter and the intermediate shaft portion. A preferred polymer is a high density polyurethane, while a preferred shaft portion formed in the end of each roller is stainless steel.

BRIEF DESCRIPTION OF THE DRAWINGS

Other objects, features and advantages of the present invention will be apparent from the written description and the drawings, in which:

FIG. 1 is a front elevation of a suspension idler mold in accordance with the present invention;

FIG. 2 is a front elevation of the vertical mold of FIG. 1 open to show the mold cavities with the shafts in place;

FIG. 3 is a sectional view of the vertical mold of FIGS. 1 and 2 filled with a liquid polymer;

FIG. 4 is a sectional view taken on the line 4—4 of FIG. 2;

FIG. 5 is a partial sectional view of one suspension idler having a support bearing attached to the molded in shaft members;

FIG. 6 is a sectional view taken on the line 6—6 of FIG. 5;

FIG. 7 is a side elevation of a suspension idler attached to a support and supporting belt thereon.

FIG. 8 is a perspective view of the second embodiment of a suspension idler mold in accordance with the present invention;

FIG. 9 is a partial elevation of the mold of FIG. 8 opened to show the mold cavities;

FIG. 10 is a sectional view taken on the line 10—10 of FIG. 9;

FIG. 11 is a sectional view taken on the line 11—11 of FIG. 10;

FIG. 12 is a sectional view taken on the line 12—12 of FIG. 8; and

FIG. 13 is a sectional view taken through an idler in accordance with the present invention showing the shaft anchor formed herein.

DESCRIPTION OF THE PREFERRED EMBODIMENTS

Referring to FIGS. 1 through 4 of the drawings, a vertical mold 10 for molding a suspension idler is illustrated having two halves 11 and 12 hinged together by hinge members 13. The mold half 11 is attached to a base support 14 and has mold door latches 15 attached thereto for engaging latching brackets 16 attached to the mold half 12. The mold halves 11 and 12 operate together to form suspension idler cavities 17 for molding a suspension idler. The cavity 17 has a plurality of intermediate roller cavity portion 18 connected to each other by shaft cavity portions 20. Each roller cavity portion 18 has an angled surface 21 and 22 angling from each side of the perimeter of the roller cavity 18 to the intermediate shaft cavity portion 20. The vertical mold 10 has an enlarged end roller cavity 23 at one end and an enlarged roller cavity 24 at the other end, which end portion has a outer end surface 25 adjacent the cavity 23 and 26 adjacent the cavity 24. The cavities are provided with mold alignment pins 27. The vertical mold 10 has a shaft opening 28 at the top side and a shaft opening 30 at the bottom side thereof, while the top side also has an overflow and air escape opening 30. An upper shaft positioning and support bracket 31 is attached to the mold half 11 by nuts 32 and has grooves 33 with shaft support member 34 therein, which is attached to an end shaft portion 35 in the bearing retainer ring groove 36 in the shaft 35. The opposite end of the shaft 35 has an anchor 37 formed thereon. Similarly, the opposite side of the mold 10 has a lower shaft positioning and support bracket 38 attached to the mold portion 11 and having a shaft 40 passing through an opening 30 into the mold cavity portion 24 and supported by shaft support member 41 connected to the shaft with fixedly mounted in grooves 42 in the bracket 38 and a bearing retainer ring groove 43 in the shaft 40. The shaft 40 also has an anchor 44 formed on the end thereof and located in the cavity portion 24. The mold cavity 17 has a polymer input line 45 connected into the bottom of the vertical mold 10 to feed the polymer from the bottom of the cavity 17 to the top of the cavity which flow of polymer is controlled by a cutoff value 46. The bearing retainer ring can also be attached to shafts 35 and 40 and used to support the shaft support brackets 31 and 38 without departing from the spirit and scope of the invention.

One preferred polymer is a high density polyurethane. The polymer is fed through the inlet pipe 45 until the cavity 17 is filled and the liquid polymer passes out the opening 30, at which time the valve 46 can be manually cut off. Once the polymer has cured, the mold can be opened as shown in FIG. 2, and the extension idler removed. The shafts 35 are released by the opening of the mold so that the shaft 35 can be slid off shaft support member 33 and shaft 40 slid off support member 41. The mold 10 advantageously allows for the filling of a polymer without the entrapment of air by the angled surfaces 21 and 22, and by the filling of the mold from the bottom, thereby forcing air out the opposite end opening 30 as the mold cavity is filled with no place for the entrapment of air during the molding. In addition, the shafts 35 and 40 are held in position by the same grooves which also serve to attach the support bearings to the shafts of the completed suspension idler. Supporting the shafts 35 and 40 in this manner in a vertical mold with the anchors 37 and 44 to prevent the loosening of the shafts 35 and 40 assures the suspension idler of always the exact same length. The mold cavities 17 may be coated with a polytrifluorochloroethylene if desired, to assist in the removal of the cured suspension idler. It should also be noted that a nylon string, or the like, can be connected through the mold and this directs the flow of the liquid polymer towards the strings and helps prevent the entrapment of air in a differently designed mold.

The process of making a suspension idler using the molding apparatus 10 involves making a molding apparatus as shown in FIGS. 1 through 4, making shaft ends 35 and 40 as shown, then attaching the shafts 35 and 40 to the brackets 31 and 38 with the shaft support members 33 and 41. The mold cavity 17 is filled from the bottom upward through the line 45 until the liquid polymer overflows through the opening 30 and the molded suspension idler is cured and removed from the mold 10 and attached to a support bearing with the support bearing retainer rings. This vertical molding assures concentricity and the same length for each idler without resorting to tensioned steel or plastic cables or chains.

Turning now to FIGS. 5 through 7, a suspension idler in accordance with the present invention is illustrated having an elongated, flexible, polymer suspension idler member 50 having intermittent rollers 51 connected to intermittent shaft portions 52 and having an angles surface 53 between the perimeter of the rollers 51 and the shaft portions 52 and a wider end roller member 54 and 55 on each end. A support shaft 56 is mounted in the end roller 54. Each support shaft has an anchor 58 formed thereon or welded thereto formed in the end portion 55 and protruding therefrom and having an annular groove 60 in the end thereof for accepting the bearing retainer ring 59 for attaching a bearing 62 to each end. The shape of the anchor 58 is more clearly illustrated in FIG. 6 as having a generally flat surface and having a plurality of notched portions 63 therein formed in the polymer body 50. The bearing retainer ring 59 is illustrated attached to the shaft 56 in FIG. 4, and the elongated, flexible, polymer suspension idler 50 is illustrated in FIG. 7 attached to the idler mounting means 64 by fabricated stirrup-type brackets 65 supporting bearings 62.

A continuous endless troughing belt 66 is shown riding on the suspension idler 50 with the belt returning underneath the suspension idler 50. The suspension idler advantageously is produced without normal reinforcing cable or chain passing therethrough and with polymers, such as a high density polyurethane nor normally used for suspension idlers because of the difficulty of molding the material with a center cable or chain. The idler can advantageously withstand the friction and wear on the end shafts by virtue of that portion being steel or a similar material.

Turning now to FIGS. 8 through 12 of the drawings, another embodiment of mold in accordance with the present invention is illustrated for molding a suspension idler. The mold is the same as that illustrated in connection with FIGS. 1 through 3 having two halves 11 and 12 hinged together by hinge 13 and supported on a base support 14 and having mold door latches attached thereto for engaging latching brackets 16 attached to the mold half 12. The mold halves 11 and 12 operate together to form suspension idler cavities 17 for molding a suspension idler. This mold includes improvements in the upper shaft positioning of support bracket 31 attached to the mold half 11 by nuts 32 and has a shaft support member 34 therein. The plurality of shims 78 are of predetermined thickness and are positioned beneath the shaft support member 34. The shims can be added or removed to precisely position the shaft 35 having the anchor 37 attached thereto in the mold cavity 23. the shaft support member 34 is held by threaded member 79 attached thereto and locked by tightening the knob 80 having threads therein onto bracket 31. Shims 78 are locked in place by threaded bolts 32. Knob 80 is loosened after curing an idler roller to allow support 33 to be slid back during engaging shaft 35 and permitting the idler to be removed from the mold. This improvement in the support for the shaft 35 allows polymer suspension idlers to be an exact length when the polymer cures, which is especially important since different polymers and even different batches of the same polymer will vary in shrinkage during curing. The shafts 35 and 40 must be very precisely positioned to allow for shrinkage. This is especially important because idlers must be of a precise length to operate properly. The internally threaded lock down knob 80 fits onto externally threaded shaft 79 which extends through the aperture 82 which is slot shaped to allow positioning of the shaft 79 in support member 34, as shown by the arrows in FIG. 10.

The present mold is also improved by the addition of heater jacket 68 connected by heater wires 70 which are connected to heater controls 72 so that the heat can be maintained in a precise controlled pattern for the proper curing of the different polymers molded in the idler mold 10. A mold handle 74 is attached to the mold half 12 assists in opening the mold, as does a slot 76, formed therein for prying with a prying tool, such as a large screwdriver. The mold has a further improvement in the use of a guide pin aperture 27 for accepting a guide pin 27. Guide pin 27 has a generally cone shaped tip to allow it to engage the aperture 27(a) and guide the pin 27 thereto for precisely aligning the molds when the molds are closed.

It will, of course, be clear that more than one guide pin and guide pin aperture can be utilized with the molds and that the perture can be cone shaped rather than the pin 27 if desired, without departing from the spirit and scope of the invention.

As seen in FIG. 12, the aperture 27(a) has the pin 27 therein in the closed mold. Pin 27 is press fitted into the mold half 11 and can be removed and replaced if it becomes sufficiently worn. This embodiment, like that of FIGS. 1 and 3, has a polymer input line 45 connected to a removable filter tube or nipple 48 attached into the filter tube opening 47 and has a clamp cut off means 49 for blocking the line 45 when the mold cavities are filled. Similarly, the other end of the mold has a removable vent tube 29 inserted into the opening 30.

FIG. 13 shows a sectional view taken through molded idler 50 having an anchor 58 molded therein showing a pair of openings 84 therethrough which, similar to the slots of the opening in FIG. 6, allow passage of the fluid polymer around the anchor in place.

Suspension idler failure in molded suspension idlers can result in the flexible shaft portion 19 between the first full second and third rollers from each end of the idler exclusive of the enlarged end portion 54 for supporting the shaft 57 and anchor 44. When the conveyor is inoperative, the belting tends to assume a flat posture which exerts downward pressure in the area of the end rollers, while during the time of operation without load this pressure creates a stress on the shaft portion 19. When the belt is carrying a load, the downward pressure is distributed on the rollers between the flexible shaft portion 19 on either end of the idler. The varying of the stresses, as well as the flex on the flexible shaft portion 19 of the idler 50 between load and no-load conditions of the belting can result in the early fracture of the shaft portion 19. The indication would be to make the shaft portion 19 thicker, but this makes the shaft portion more likely to fracture. I have found a definite relationship exists between the diameter and the length of the shaft sections 19, which reduces the failure. The shaft portion must be made of a greater length for its diameter and the length of the shaft sections 19, which reduces the failure. The shaft portion must be made of a greater length for its diameter, which allows the shaft portion to flex without additional stress. The relationship requires that the length indicated by "a" on the mold in FIG. 2, between the rollers and the diameter "b" of the cross-sectional area must exceed one and one-half (1½). That is, a ratio of the length "a" divided by cross-seciontal diameter "b" must be greater than 1.5. For example, the diameter might be ⅝ inch, while the length might be 1⅛ inch, which gives a ratio of 1.8. This example has been found to extend the length of time between failure of this shaft portion on idler members. Additionally, fractures in materials are believed to be caused by microscopic cracks or imperfections which cause a concentration of stresses in the material at the microscopic imperfections, which can result in eventual failure at these points. For this reason, the present mold has the portions that mold shaft 19 polished to a mirror finish to remove the machined surface marks which are not visible to the eye unless magnified. This provides a roller 50 having a smoother surface of flexible shaft portions 19 than found on other idlers and is believed to reduce the concentration of stresses at points that can then increase the likelihood of failure.

It should be understood that the present invention is not to be construed as limited to the particular forms shown herein, which are to be considered illustrative rather than restrictive.

I claim:

1. A suspension idler comprising in combination:
    an elongated flexible molded polymer idler member having a plurality of intermediate rollers formed thereon connected by a plurality of spaced flexible shaft portions;
    a plurality of said plurality of spaced flexible shaft portions having a length between the rollers to the cross-section diameter ratio of greater than 1.5, and a plurality of said plurality of spaced flexible shaft portions having surfaces of increased smoothness resulting from mold portions polished to a mirror-like finish;
    said idler member having an end roller on each end thereof and having a rigid shaft molded in each end roller and protruding therefrom;
    each said intermediate roller being shaped with a sloped surface between the perimeter of the roller and said connecting molded shaft portion; and
    each said rigid shaft having means for attaching a bearing thereto.

2. A suspension idler in accordance with claim 1, in which each said rigid shaft is a steel shaft having an annular groove on one end thereof and an anchor formed on the other end portion thereof.

3. A suspension idler in accordance with claim 2, in which said rigid shaft member is stainless steel.

4. A suspension idler in accordance with claim 3, in which elongated, flexible, solid polymer idler member is a high density polyurethane idler member having rigid shafts formed in each end thereof and protruding from each end thereof.

5. A suspension idler in accordance with claim 4, in which each said end roller is wider than said intermediate rollers and has said rigid shaft and an anchor formed therein and protruding therefrom.

6. A suspension idler in accordance with claim 5, in which each said end roller has one sloped side angling from the perimeter thereof to the shaft portion connecting said end roller to an intermediate roller.

7. A suspension idler in accordance with claim 1, in which said plurality of said plurality of spaced flexible shaft portions has a length between rollers to the cross-section diameter ratio of approximately 1.8.

* * * * *